United States Patent
Minami

(10) Patent No.: US 8,160,792 B2
(45) Date of Patent: Apr. 17, 2012

(54) CLUTCH FAILURE DETECTION SYSTEM, STRADDLE-TYPE VEHICLE, AND METHOD FOR DETECTING FAILURE

(75) Inventor: Kengo Minami, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 1091 days.

(21) Appl. No.: 12/035,771

(22) Filed: Feb. 22, 2008

(65) Prior Publication Data

US 2008/0230345 A1 Sep. 25, 2008

(30) Foreign Application Priority Data

Feb. 23, 2007 (JP) ................................. 2007-043645
Sep. 6, 2007 (JP) ................................. 2007-231134

(51) Int. Cl.
*G06F 17/00* (2006.01)

(52) U.S. Cl. ....... 701/67; 192/30 W; 477/906; 701/29.1; 701/33.5; 701/31.8

(58) Field of Classification Search ............... 701/29, 701/35, 67; 477/906
See application file for complete search history.

(56) References Cited

U.S. PATENT DOCUMENTS

| | | | | | |
|---|---|---|---|---|---|
| 3,240,305 | A | * | 3/1966 | Hirano | 192/70.17 |
| 5,067,599 | A | * | 11/1991 | Roder et al. | 477/176 |
| 5,499,952 | A | * | 3/1996 | Huber et al. | 477/115 |
| 5,679,099 | A | * | 10/1997 | Kato et al. | 477/176 |
| 6,040,768 | A | * | 3/2000 | Drexl | 340/453 |
| 6,047,800 | A | * | 4/2000 | Kosik et al. | 192/3.57 |
| 2006/0154781 | A1 | * | 7/2006 | Petzold et al. | 477/80 |

FOREIGN PATENT DOCUMENTS

| | | |
|---|---|---|
| DE | 10 2006 042 608 A1 | 3/2008 |
| DE | 10 2007 050 301 A1 | 4/2009 |
| EP | 1 681 496 A2 | 7/2006 |
| JP | 07-056299 | 6/1995 |

* cited by examiner

*Primary Examiner* — Kaitlin Joerger
*Assistant Examiner* — Ernesto Suarez
(74) *Attorney, Agent, or Firm* — Rabin & Berdo, P.C.

(57) ABSTRACT

A failure detection system for accurately detecting a failure of a clutch. A clutch actuation mechanism changes the relative positions of drive-side and driven-side members of the clutch. A position detector detects a position of the clutch actuation mechanism as a clutch position. A control unit obtains torque transmitted from the drive-side member to the driven-side member as actual transmission torque. The control unit detects a failure of the clutch based on the actual transmission torque and the clutch position.

20 Claims, 9 Drawing Sheets

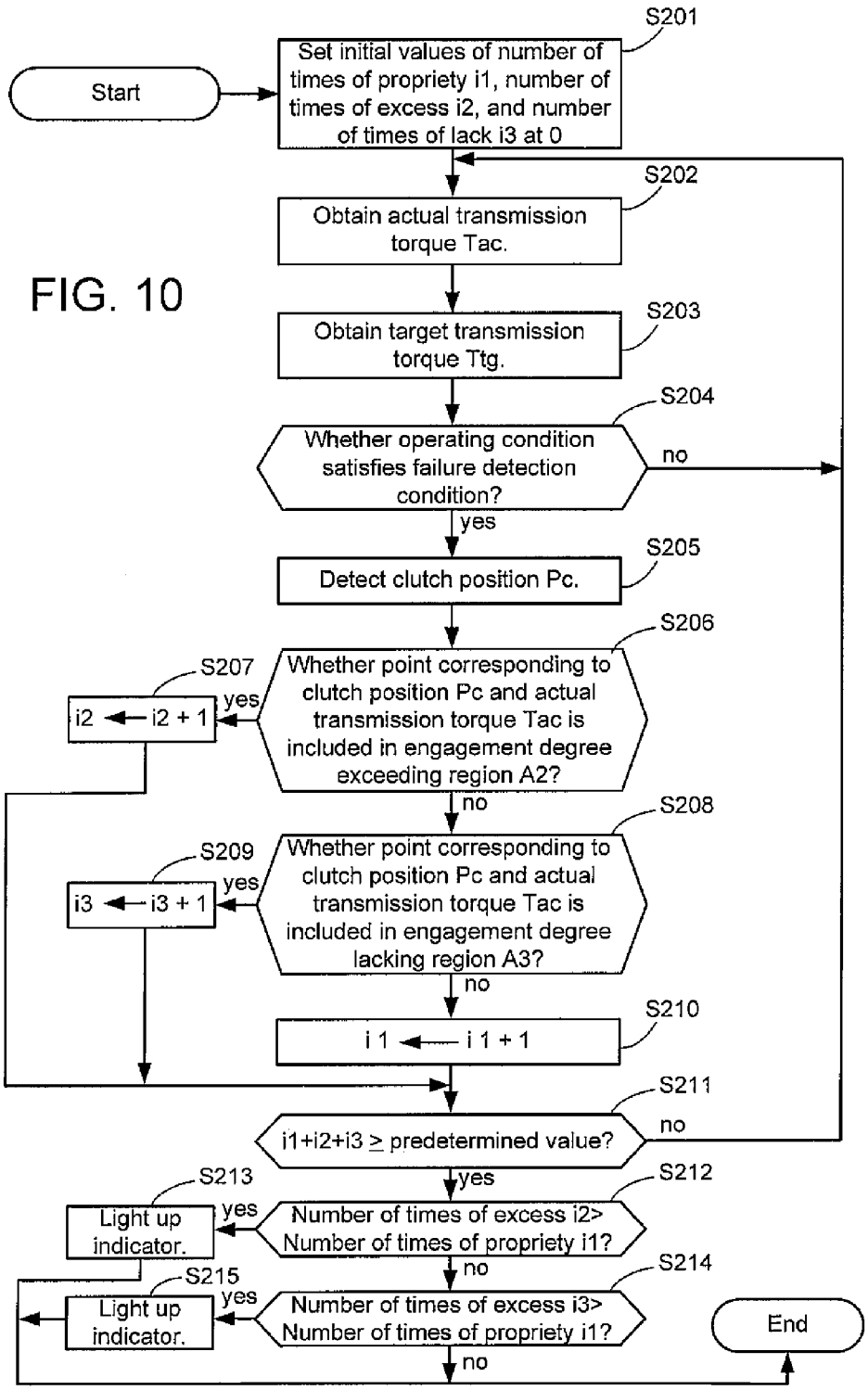

CLUTCH FAILURE DETECTION SYSTEM, STRADDLE-TYPE VEHICLE, AND METHOD FOR DETECTING FAILURE

RELATED APPLICATIONS

This application claims the benefit of priority under 35 USC 119 of Japanese patent application no. 2007-043645, filed on Feb. 23, 2007, and Japanese patent application no. 2007-231134, filed on Sep. 6, 2007, which applications are hereby incorporated by reference in their entireties.

BACKGROUND OF THE INVENTION

1. Field of the Invention

The present invention relates to detection of a failure of a clutch mounted on a vehicle.

2. Description of Related Art

Some clutches mounted on vehicles are provided with a drive-side member (for example, a friction disk) that rotates upon receipt of engine torque, and a driven-side member (for example, a clutch disk that is pressed by the drive-side member to rotate together with the drive-side member. The drive-side and driven-side members wear out after long service, which can lower the degree of engagement of the clutch relative to the initial degree. In addition, when hydraulic pressure is used to engage or disengage the clutch, bubbles are formed within a hydraulic hose, which can cause incomplete clutch disengagement.

Conventional vehicles that actuate an actuator to engage or disengage the clutch according to a rider's gear shifting instructions employ technology for detecting and informing the rider of clutch failures. For example, JP-B-Hei 7-56299 provides a device with a potentiometer for detecting the position of a movable part of an actuator that engages or disengages the clutch (hereinafter referred to as clutch position). Based on the detected clutch position, the device determines the presence or absence of a clutch failure. Specifically, the device determines that a failure has occurred if the clutch position at which the driven-side member starts rotating falls outside an appropriate range that is predetermined at manufacturing.

However, when the vehicle runs downslope, the clutch position at which the driven-side member starts rotating is closer to a clutch position at which the clutch is disengaged, compared to when the vehicle runs on a flat road. Meanwhile, when the vehicle runs upslope, the clutch position at which the driven-side member starts rotating is closer to a clutch position at which the clutch is engaged, compared to when the vehicle runs on a flat road. Thus, the gradient of the slope must be considered in predetermining an appropriate range of the clutch position for the device of JP-B-Hei 7-56299. This makes it difficult to predetermine the appropriate range that leads to accurate failure detection.

SUMMARY OF THE INVENTION

The present invention addresses these problems and provides a system for detecting a clutch failure in a straddle-type vehicle that reduces the impact of the road gradient.

The present invention is directed to a clutch failure detection system including a clutch actuation mechanism for changing relative positions of drive-side and driven-side members of a clutch. A position detector detects a position of the clutch actuation mechanism as a clutch position. A torque obtaining section obtains torque transmitted from the drive-side member to a downstream mechanism in a torque transmission path as transmission torque, the downstream mechanism including the driven-side member. A failure detecting section detects a failure of the clutch based on the transmission torque and the clutch position.

The present invention is also directed to a straddle-type vehicle including the clutch failure detection system.

Further, the present invention is directed to a method for detecting a failure including the steps of detecting a position of a clutch actuation mechanism for changing relative positions of drive-side and driven-side members of a clutch as a clutch position; obtaining torque transmitted from the drive-side member to a downstream mechanism in a torque transmission path as transmission torque, the downstream mechanism including the driven-side member; and detecting a failure of the clutch based on the transmission torque and the clutch position.

The present invention reduces the impact of road gradient on detection of clutch failure. Torque that is transmitted from the drive-side member to the driven-side member of the clutch in a half-clutch state is generally determined depending on clutch position, independent of road gradient. Thus, a clutch failure can be detected based on transmission torque and clutch position, even when the vehicle runs on a slope. The straddle-type vehicle of the invention may be a motorcycle (including a scooter), a four-wheeled buggy, a snowmobile or a two-wheeled electric vehicle, for example.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 10 is a flowchart illustrating an example of processing steps executed by the control unit to detect a failure of the clutch.

DETAILED DESCRIPTION OF THE INVENTION

Figure 1:
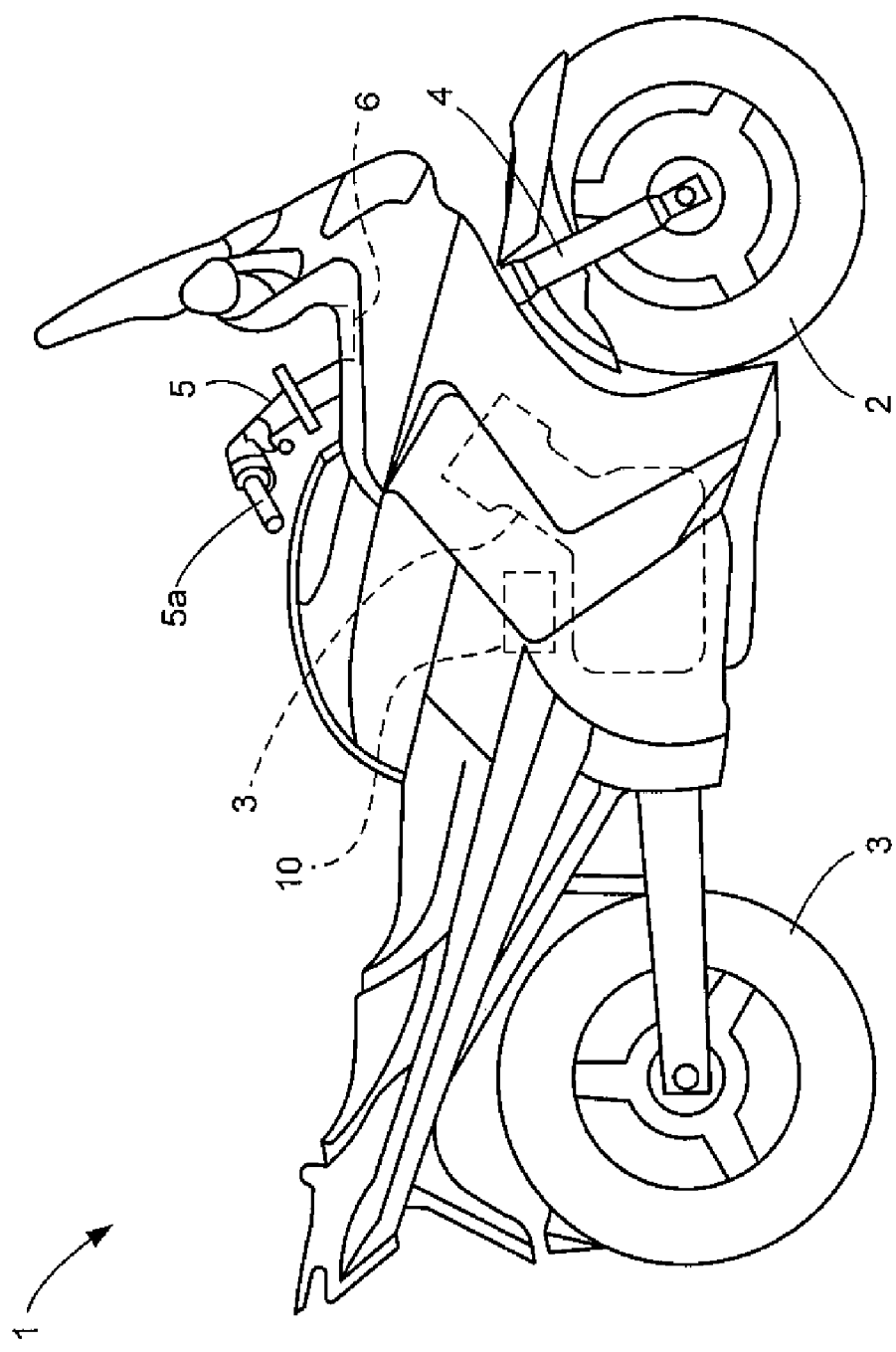
FIG. 1 is a side view of a motorcycle provided with a failure detection system according to an embodiment of the present invention.
Figure 2:
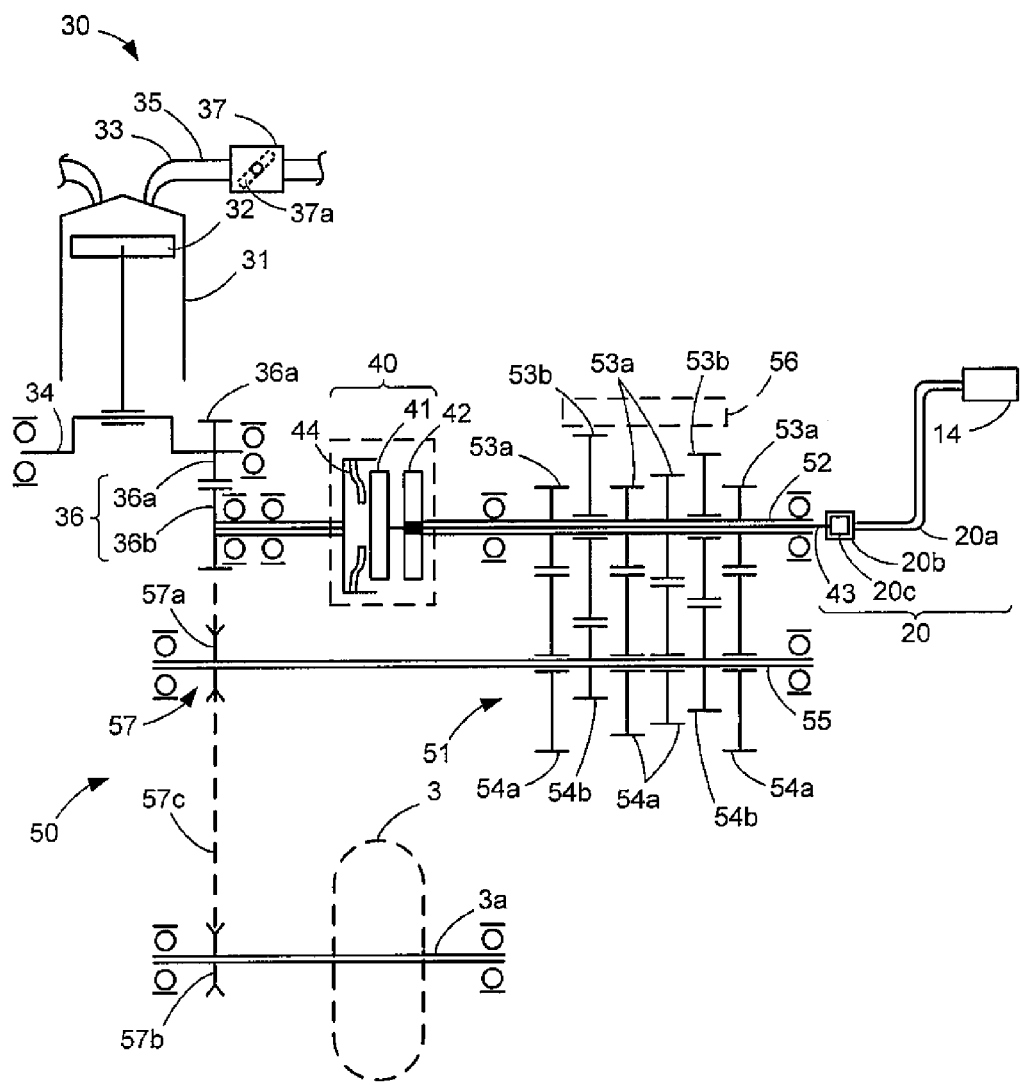
FIG. 2 is a schematic view of a mechanism located on a torque transmission path of the motorcycle.

An embodiment of the present invention is now described with reference to the drawings. FIG. 1 is a side view of a motorcycle 1 provided with a clutch failure detection system 10 according to the present invention. FIG. 2 is a schematic view of a mechanism located on a torque transmission path of motorcycle 1.

As shown in FIGS. 1 and 2, in addition to failure detection system 10, motorcycle 1 comprises an engine 30, a primary deceleration mechanism 36, a clutch 40, a secondary deceleration mechanism 50, a front wheel 2 and a rear wheel 3. Motorcycle 1 is a semi-automatic vehicle that changes shift gears of a gearbox 51 without the need for a rider to operate the clutch. Failure detection system 10 detects a failure of clutch 40, while controlling the degree of engagement of clutch 40.

As shown in FIG. 1, front wheel 2 is supported by lower ends of a front fork 4 and handlebars 5 are connected to the top of front fork 4. An instrument panel 6 having thereon a speed meter and a tachometer is installed in front of handlebars 5. An acceleration grip 5a mounted to a right end of handlebars 5 is connected to a throttle valve 37a provided in a throttle body 37 (FIG. 2). Throttle valve 37a is opened according to a rider's accelerator operation, and a certain amount of air that depends on the opening of throttle valve 37a is delivered to engine 30. Motorcycle 1 may be provided with an electronically-controlled throttle device. In this case, there are provided a sensor for detecting the rider's accelerator operation and an actuator for rotating throttle valve 37a according to the accelerator operation detected by the sensor.

As shown in FIG. 2, engine 30 has a cylinder 31, a piston 32, an intake port 33 and a crankshaft 34. Throttle body 37 is connected to intake port 33 via an intake pipe 35.

Throttle valve 37a is placed within an intake passage of throttle body 37. A mixture of air that is supplied from throttle body 37 and fuel supplied from a fuel supplier (for example, an injector or carburetor), flows into an interior of cylinder 31. Burning the air-fuel mixture causes piston 32 to reciprocate within cylinder 31. Reciprocating motion of piston 32 is converted into rotating motion by crankshaft 34, thereby outputting torque from engine 30.

Primary deceleration mechanism 36 includes a drive-side primary deceleration gear 36a that operates in conjunction with crankshaft 34; and a driven-side primary deceleration gear 36b that meshes with primary deceleration gear 36a. Primary deceleration mechanism 36 decelerates rotation of crankshaft 34 at a gear ratio between these gears.

Clutch 40 transmits torque outputted from engine 30 to the downstream side of clutch 40 or interrupts transmission of the torque. Clutch 40 is a friction clutch, for example, and is provided with a drive-side member 41 and a driven-side member 42. Drive-side member 41 includes a friction disk, for example, and rotates together with primary reduction gear 36b. Driven-side member 42 includes a clutch disk, for example, and rotates together with a main shaft 52. Drive-side member 41 and driven-side member 42 are pressed against each other by elastic force of a clutch spring 44 at the time of engaging clutch 40, so that torque of engine 30 is transmitted from drive-side member 41 to driven-side member 42. In turn, at the time of disengaging clutch 40, driven-side member 42 and drive-side member 41 are moved away from each other, so that torque transmission from drive-side member 41 is interrupted. Failure detection system 10 has a clutch actuation mechanism 20 that includes a clutch actuator 14. Clutch actuation mechanism 20 performs engaging and disengaging operations of clutch 40.

Secondary speed reducing mechanism 50 decelerates rotation of main shaft 52 and transmits the decelerated rotation to an axle 3a of rear wheel 3. Secondary speed reducing mechanism 50 is provided with a gearbox 51 and a transmission mechanism 57. Gearbox 51 is a mechanism to change reduction ratios, such as a constant-mesh gearbox and a selective-sliding gearbox.

Gearbox 51 has plural shift gears 53a (for example, first-speed, second-speed, third/fourth-speed gears) and shift gears 53b (for example, fifth-speed and six-speed gears) on main shaft 52. Gearbox 51 also has plural shift gears 54a (for example, first-speed, second-speed, third/fourth-speed gears) and shift gears 54b (for example, fifth-speed and six-speed gears) on countershaft 55. Shift gears 53a are spline-connected to and operate in conjunction with main shaft 52. Shift gears 54a turn free to countershaft 55 and mesh with shift gears 53a. Shift gears 53b run idle to main shaft 52. Shift gears 54b mesh with corresponding shift gears 53b and are spline-connected to and operate in conjunction with countershaft 55.

Gearbox 51 also has a gearshift mechanism 56 that includes a shift fork and a shift drum, for example, and selectively moves shift gears 53a, 53b, 54a, 54b in the axial direction of main shaft 52 or countershaft 55. Gearshift mechanism 56 causes shift gears 53b, 54a, which turn free to the corresponding shafts, to connect with adjacent shift gears 53a, 54b, which operate in conjunction with the corresponding shafts. This changes the pairs of shift gears to transmit torque from main shaft 52 to countershaft 55. Gearshift mechanism 56 is actuated by power inputted from a shift actuator 16.

Transmission mechanism 57 decelerates rotation of countershaft 55 and transmits the decelerated rotation to axle 3a of rear wheel 3. Transmission mechanism 57 includes: a drive-side member 57a (for example, a drive-side sprocket) that operates in conjunction with countershaft 55; a driven-side member 57b (for example, a driven-side sprocket) that operates in conjunction with axle 3a; and a transmission member 57c (for example, a chain) that transmits torque from drive-side member 57a to driven-side member 57b.

Torque outputted from engine 30 is transmitted to drive-side member 41 of clutch 40 via primary speed reducing mechanism 36. Torque transmitted to drive-side member 41 is transmitted to axle 3a of rear wheel 3 via driven-side member 42, gearbox 51, and transmission mechanism 57 when clutch 40 is engaged or when drive-side member 41 and driven-side member 42 contact each other, that is, when clutch 40 is in a half-clutch state.

Figure 3:
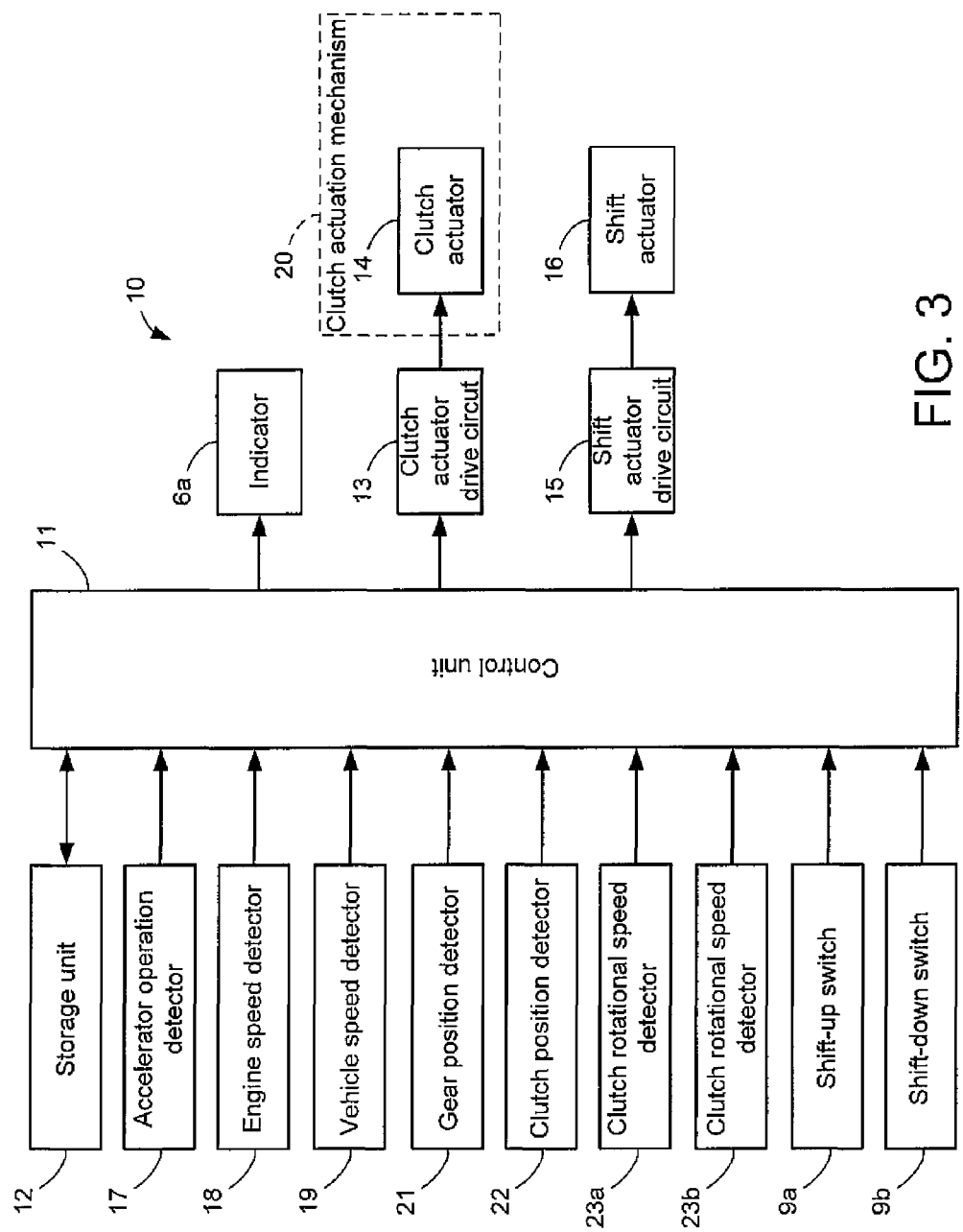
FIG. 3 is a block diagram of the failure detection system.

Failure detection system 10 is now described. FIG. 3 is a block diagram of failure detection system 10. As shown in FIG. 3, failure detection system 10 comprises a control unit 11, a storage unit 12, a clutch actuator drive circuit 13, clutch actuation mechanism 20, a shift actuator drive circuit 15, a shift actuator 16, an accelerator operation detector 17, an engine speed detector 18, a vehicle speed detector 19, a gear position detector 21, a clutch position detector 22, clutch rotational speed detectors 23a, 23b and an indicator 6a. Control unit 11 is connected to a shift-up switch 9a and a shift-down switch 9b.

Control unit 11 includes a central processing unit (CPU), and actuates clutch actuation mechanism 20 in accordance with programs stored in storage unit 12 to control the degree of engagement of clutch 40. Control unit 11 also actuates shift actuator 16 to change deceleration ratios of gearbox 51. Further, control unit 11 executes processing for detecting the presence or absence of a failure of clutch 40.

Storage unit 12 includes a nonvolatile memory and a volatile memory. Storage unit 12 stores programs to be executed by control unit 11 and tables or expressions to be used for processing in control unit 11.

Clutch actuator drive circuit 13 supplies electric power to drive clutch actuator 14 in accordance with a control signal inputted from control unit 11.

Clutch actuation mechanism 20 changes the relative positions of drive-side member 41 and driven-side member 42 or changes the degree of engagement of clutch 40 according to the control signal outputted from control unit 11. Clutch actuation mechanism 20 comprises clutch actuator 14, which includes a motor, a hydraulic hose 20a, a piston 20c, a push rod 43 and the like. Oil is filled within hydraulic hose 20a to transmit force outputted from clutch actuator 14 to a cylinder 20b. Piston 20c is located within cylinder 20b and uses hydraulic pressure within hydraulic hose 20a to press push rod 43 or release the pushed push rod 43. When push rod 43 is pressed by clutch actuator 14 through hydraulic pressure, it moves drive-side member 41 and driven-side member 42 away from each other against the elastic force of clutch spring 44, so that clutch 40 is disengaged. In contrast, when the pressed push rod 43 is released by clutch actuator 14, it returns to its original position (the position at the time when clutch 40 is engaged) using the elastic force of clutch spring 44. Thus, drive-side member 41 and driven-side member 42 approach each other, so that clutch 40 is engaged. When clutch 40 is in a half-clutch state under which only a part of the torque of engine 30 is transmitted from drive-side member 41 to driven-side member 42, clutch actuation mechanism 20 changes the degree of engagement of clutch 40 gradually according to the control signal from control unit 11.

Shift actuator drive circuit 15 supplies electric power to drive shift actuator 16 in accordance with the control signal inputted from control unit 11. Shift actuator 16 includes, for example, a motor, and receives electric power outputted from shift actuator drive circuit 15 to actuate gearshift mechanism 56 of gearbox 51. Gearshift mechanism 56 changes shift gears 53a, 53b, 54a, 54b to transmit toque from main shaft 52 to countershaft 55, in order to change the deceleration ratios.

Accelerator operation detector 17 detects an amount of accelerator operation by the rider (hereinafter referred to as accelerator displacement (for example, throttle opening)). Examples of accelerator operation detector 17 are a throttle position sensor mounted to throttle body 37 and an accelerator position sensor mounted to accelerator grip 5a to detect a rotation angle of accelerator grip 5a. Accelerator operation detector 17 outputs an electric signal to control unit 11 according to accelerator displacement. Control unit 11 detects accelerator displacement by the rider based on the electric signal.

Engine speed detector 18 detects a rotational speed of engine 30 (hereinafter referred to as engine speed). Examples of engine speed detector 18 are a crank angle sensor for outputting a pulse signal with a frequency according to the rotational speed of crankshaft 43 or primary reduction gears 36a, 36b and a tachogenerator for outputting a voltage signal according to the rotational speed thereof. Control unit 11 calculates engine speed based on the signal inputted from engine speed detector 18.

Vehicle speed detector 19 detects a vehicle speed, and outputs a signal (hereinafter referred to as vehicle speed signal) to control unit 11 according to, for example, the rotational speed of axle 3a of rear wheel 3 or countershaft 55. Control unit 11 calculates the vehicle speed based on the vehicle speed signal.

Gear position detector 21 detects positions of shift gears 53a, 53b, 54a, 54b provided movably in the axial direction of countershaft 55 or main shaft 52. An example of gear position detector 21 is a potentiometer mounted to gearshift mechanism 56 or shift actuator 16. Gear position detector 21 outputs a signal to control unit 11 according to positions of shift gears 53a, 53b, 54a, 54b. Based on the input signal, control unit 11 detects that some shift gears 53a, 53b, 54a, 54b have finished moving and the deceleration ratio of gearbox 51 has already changed.

Clutch position detector 22 detects the position (hereinafter referred to as clutch position Pc) of a movable part of clutch actuation mechanism 20, such as, for example, the rotation angle of an output shaft of clutch actuator 14 or the axial position of piston rod 43. An example of clutch position detector 22 is a potentiometer for outputting a signal according to the axial position of push rod 43 or the position of piston 20c in cylinder 20b. Alternatively, clutch position detector 22 may be a potentiometer for outputting a signal according to the rotation angle of the output shaft of the motor included in clutch actuator 14. Based on the signal inputted from clutch position detector 22, control unit 11 detects clutch position Pc. Where no failure occurs to clutch 40, such as wear-out of drive-side member 41 or driven-side member 42 and bubbles within hydraulic hose 20a, clutch position Pc, detected by clutch position detector 22 corresponds to the degree of engagement of clutch 40 achieved at the point in time of the detection of clutch position Pc. In contrast, if a failure occurs, it causes a discrepancy between detected clutch position Pc and the actual degree of engagement of clutch 40. This discrepancy problem is detected by control unit 11.

Clutch rotational speed detector 23a detects rotational speed of drive-side member 41 of clutch 40. Examples of clutch rotational speed detector 23a are a rotary encoder for outputting a pulse signal with a frequency according to the rotational speed of drive-side member 41 and a tachogenerator for outputting a voltage signal according to the rotational speed of drive-side member 41. In turn, clutch rotational speed detector 23b detects rotational speed of driven-side member 42 of clutch 40. Examples of clutch rotational speed detector 23b are a rotary encoder and a tachogenerator, as described for clutch rotational speed detector 23a.

Shift-up switch 9a and shift-down switch 9b allow the rider to provide instructions to change deceleration ratios of gearbox 51. Switches 9a, 9b output a signal to control unit 11 according to the instructions of gear shifting. According to the input signal, control unit 11 actuates shift actuator 16 and clutch actuation mechanism 20 to change shift gears 53a, 53b, 54a, 54b of gearbox 51.

Indicator 6a is disposed, for example, on instrument panel 6, and is provided with an alarm lamp to inform the rider of a failure of clutch 40, a meter to indicate the severity of the failure, or the like. Indicator 6a lights up the alarm lamp or the like according to the signal inputted from control unit 11.

Figure 4:
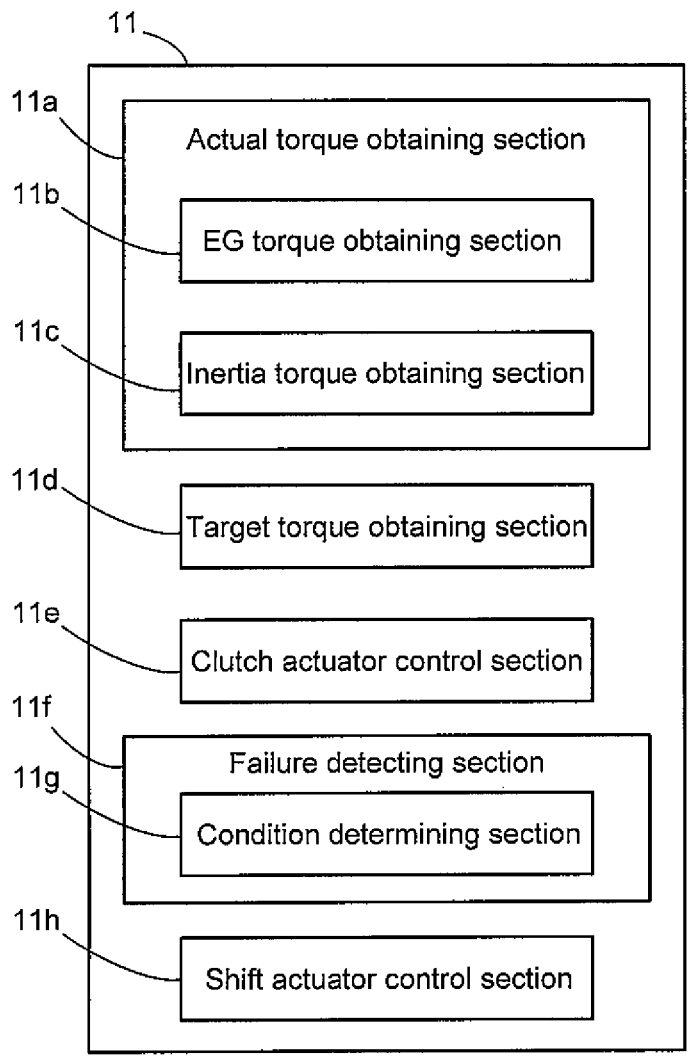
FIG. 4 is a block diagram illustrating processing functions of a control unit.

The processing executed by control unit 11 is now described. Control unit 11 obtains torque transmitted via clutch 40 during engaging operation of clutch 40 (switching clutch 40 from the disengaged state to the engaged state). Based on the obtained torque and torque that is supposed to be transmitted via clutch 40, control unit 11 actuates clutch actuation mechanism 20 to control the degree of engagement of clutch 40. Control unit 11 also executes processing for detecting a failure of clutch 40 during engaging operation of clutch 40. FIG. 4 is a block diagram illustrating the processing functions of control unit 11. As shown in FIG. 4, control unit 11 includes an actual torque obtaining section 11a; a target torque obtaining section 11d, a clutch actuator control section 11e; a failure detecting section 11f; and a shift actuator control section 11h. Actual torque obtaining section 11a includes an EG torque obtaining section 11b and an inertia torque obtaining section 11c. Failure detecting section 11f includes a condition determining section 11g.

Actual torque obtaining section 11a is first described. Actual torque obtaining section 11a obtains torque (hereinafter referred to as actual transmission torque Tac) transmitted from drive-side member 41 to a downstream mechanism in the torque transmission path including driven-side member 42, such as driven-side member 42, secondary deceleration mechanism 50 and axle 3a. Actual torque obtaining section 11a calculates actual transmission torque Tac based on torque TEac outputted from engine 30 (hereinafter referred to as EG torque) and based on torque TIac (hereinafter referred to as EG-side inertia torque) produced due to the inertia of a mechanism upstream of drive-side member 41 in the torque transmission path, such as crankshaft 34, piston 32 and primary deceleration mechanism 36. Actual torque obtaining section 11a performs this processing in a predetermined sampling cycle (for example, several milliseconds) during engaging operation of clutch 40 in which drive-side member 41 and driven-side member 42 approach each other. Actual transmission torque Tac is described herein as torque transmitted to driven-side member 42 in the above downstream mechanism.

Storage unit 12 stores in advance a table (hereinafter referred to as EG torque table) that establishes the correspondence between EG torque TEac, and engine speed and accelerator displacement. EG torque obtaining section 11b detects accelerator displacement based on the signal inputted from accelerator operation detector 17 in a predetermined sampling cycle during engaging operation of clutch 40, while detecting engine speed based on the signal inputted from engine speed detector 18. EG torque obtaining section 11b then refers to the EG torque table to obtain EG torque TEac that corresponds to the detected accelerator displacement and engine speed.

In place of the EG torque table, storage unit 12 may store in advance a relational expression that represents the relationship between engine speed, accelerator displacement and EG torque TEac. In this case, EG torque obtaining section 11b substitutes the detected engine speed and accelerator displacement into the relational expression in order to calculate EU torque TEac.

Alternatively, EG torque obtaining section 11b may obtain EG torque TEac based on the pressure (hereinafter referred to as intake pressure) of air flowing through the interior of intake pipe 35. For example, storage unit 12 stores a table that establishes the correspondence between EG torque TEac, and the intake pressure and engine speed. In addition, a pressure sensor for outputting a signal according to the intake pressure is disposed in intake pipe 35. In this case, EG torque obtaining section 11b detects engine speed at the time when the crank angle is a predetermined value (for example, at the end of intake stroke), while detecting intake pressure based on the signal inputted from the pressure sensor. EG torque obtaining section 11b then refers to the table stored in storage unit 12 to obtain EG torque TEac that corresponds to the detected intake pressure and engine speed.

EG-side inertia torque TIac is determined according to variation in engine speed $\Omega e$ per unit time ($d\Omega e/dt$, hereinafter referred to as rate-of-change of EG speed). Storage unit 12 stores in advance an expression that associates EG-side inertia torque TIac and the rate-of-change of EG speed ($d\Omega e/dt$) with each other. Specifically, storage unit 12 stores an expression, in which EG-side inertia torque TIac is equal to a value ($I\times(d\Omega e/dt)$) obtained by multiplying the inertial moment I on the mechanism upstream of drive-side member 41 by the rate-of-change of EG speed ($d\Omega e/dt$). Inertia torque obtaining section 11c calculates the rate-of-change of EG speed ($d\Omega e/dt$) based on the signal inputted from engine speed detector 18. Inertia torque obtaining section 11c then multiplies the rate-of-change of EG speed ($d\Omega e/dt$) by inertial moment I on the mechanism upstream of drive-side member 41, and defines the multiplication result ($I\times(d\Omega e/dt)$) as EG-side inertia torque TIac. Alternatively, storage unit 12 may store a table that establishes the correspondence between the rate-of-change of EG speed ($d\Omega e/dt$) and EU-side inertia torque TIac. In this case, inertia torque obtaining section 11c refers to the table to obtain EG-side inertia torque TIac that corresponds to the calculated rate-of-change of EG speed.

As described above, actual transmission torque obtaining section 11a obtains actual transmission torque Tac based on EU torque TEac and EG-side inertia torque TIac. For example, storage unit 12 stores in advance an expression that represents the relationship between actual transmission torque Tac, EG torque TEac and EG-side inertia torque TIac. Also, actual transmission torque obtaining section 11a substitutes actual transmission torque Tac and EG-side inertia torque TIac, which are respectively obtained from the aforementioned processing, into the expression in order to calculate actual transmission torque Tac. For example, storage unit 12 stores the following expression (1).

$$Tac=(TEac-TIac)\times Pratio \quad (1)$$

In this expression, Pratio represents the gear ratio of primary deceleration mechanism 36 (Pratio=the number of teeth of driven-side primary deceleration gear 36b/the number of teeth of drive-side primary deceleration gear 36a). In this case, actual torque obtaining section 11a subtracts EG-side inertia torque TIac from EG torque TEac obtained from the aforementioned processing. Actual torque obtaining section 11a then multiplies the subtraction result (TEac−TIac) by the gear ratio Pratio, and defines the obtained value ((TEac−TIac)×Pratio) as actual transmission torque Tac.

The processing for calculating actual transmission torque Tac is not limited to the aforementioned processing. For example, storage unit 12 may store in advance a table or an expression that establishes the correspondence between actual transmission torque Tac, and engine speed $\Omega e$, accelerator displacement and the rate-of-change of EG speed ($d\Omega e/dt$). In this case, actual torque obtaining section 11a uses the table or the expression to directly obtain actual transmission torque Tac from engine speed $\Omega e$, the rate-of-change of EG speed ($d\Omega e/dt$) and accelerator displacement.

Target torque obtaining section 11d is now described. Target torque obtaining section 11d obtains torque, which is supposed to be transmitted from drive-side member 41 to the downstream mechanism (driven-side member 42 herein) in the torque transmission path including driven-side member 42, in a predetermined sampling cycle during engaging operation of clutch 40 at start up of the vehicle or when the vehicle is running at speed below a predetermined value. Specifically, target torque obtaining section 11d obtains target transmission torque Ttg based on accelerator displacement. This processing is executed as follows, for example.

Storage unit 12 stores in advance a table (hereinafter referred to as target transmission torque table) that establishes the correspondence between target transmission torque Ttg and accelerator displacement by the rider. Target torque obtaining section 11d then refers to the target transmission torque table to obtain target transmission torque Ttg that corresponds to the detected accelerator displacement. Alternatively, storage unit 12 may store an expression that represents the relationship between accelerator displacement by the rider and the target transmission torque. In this case, target torque obtaining section 11d substitutes the detected accelerator displacement into the expression in order to calculate target transmission torque Ttg.

Figure 5:
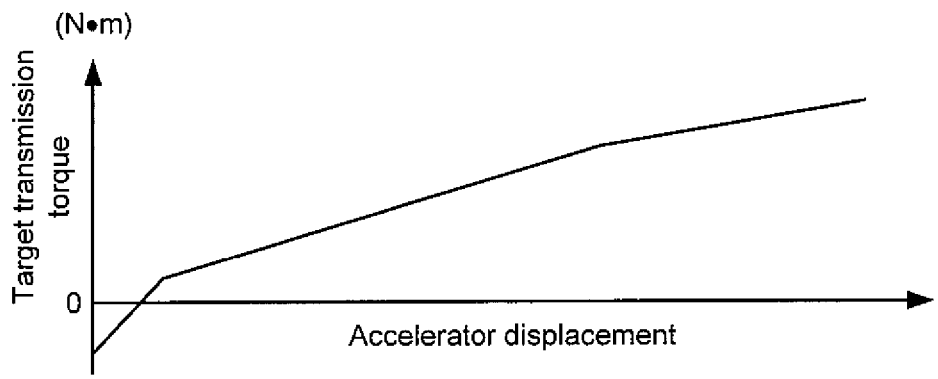
FIG. 5 is a graph illustrating the relationship between accelerator displacement and target transmission torque.

FIG. 5 is a graph showing the relationship between accelerator displacement and target transmission torque Ttg obtained from this processing. In the graph, the horizontal axis represents the accelerator displacement, and the vertical axis represents target transmission torque Ttg. As shown in FIG. 5, target transmission torque Ttg is preset to be higher as accelerator displacement becomes larger. When accelerator displacement is zero, target transmission torque Ttg is preset at a negative value.

Clutch actuator control section 11e is now described. Clutch actuator control section 11e actuates clutch actuator 14 based on the difference between actual transmission torque Tac and target transmission torque Ttg in the engaging operation of clutch 40 when the vehicle starts up or is running at low speeds. This control by clutch actuator control section 11e allows clutch 40 to be gradually switched to the engaged state. Clutch actuator control section 11e executes the following processing, for example.

Storage unit 12 stores in advance an expression (hereinafter referred to as actuation amount relational expression) that represents the relationship between the difference (hereinafter referred to as torque deviation) between target transmission torque Ttg and actual transmission torque Tac and the actuation amount of clutch actuator 14. Every time actual torque obtaining section 11a obtains actual transmission torque Tac (i.e. in a predetermined sampling cycle), clutch actuator control section 11e calculates the torque deviation. Clutch actuator control section 11e then substitutes the calculated torque deviation into the actuation amount relational expression in order to calculate the amount (hereinafter referred to as command actuation amount) by which clutch actuator 14 is to be actuated, and outputs a control signal to clutch actuator drive circuit 13 according to the command actuation amount. Clutch actuator drive circuit 13 then supplies electric power to drive clutch actuator 14 according to the control signal. Thereby, clutch actuator 14 is actuated by an amount according to the command actuation amount.

Figure 6:
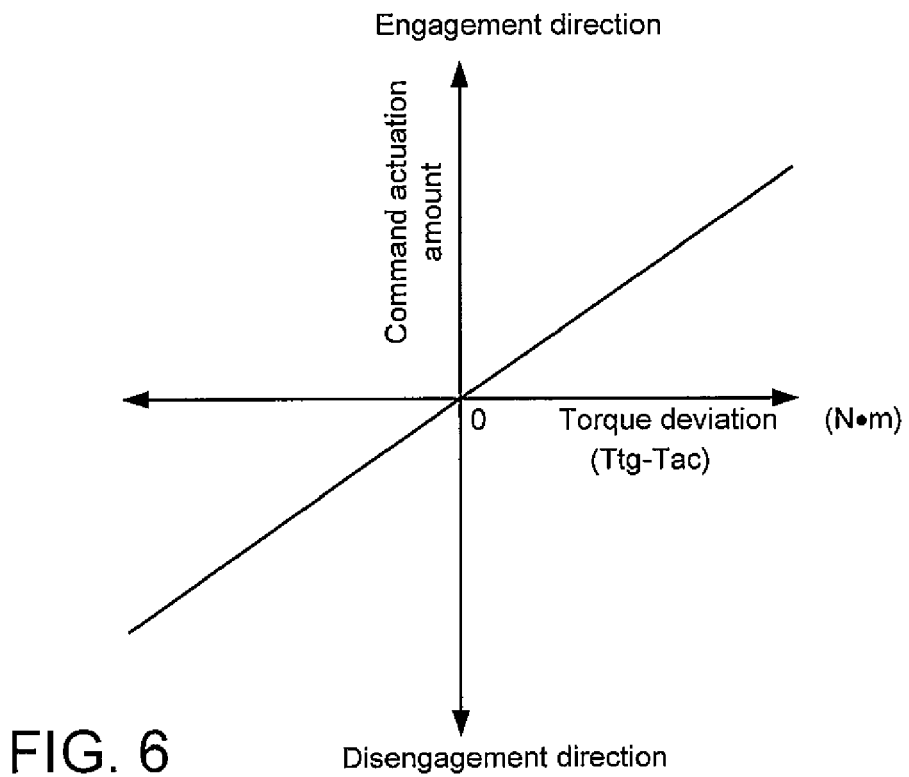
FIG. 6 is a graph illustrating the relationship between a difference between target transmission torque and actual transmission torque, and a command actuation amount obtained from an actuation amount relational expression.

FIG. 6 is a graph showing an example of the relationship between the command actuation amount and the torque deviation (Ttg−Tac) obtained from the actuation amount relational expression. As shown in FIG. 6, the actuation amount relational expression is established such that if the torque deviation (Ttg−Tac) is positive, clutch actuator 14 is actuated in the direction to engage clutch 40. In addition, the actuation amount relational expression is established such that the command actuation amount increases in proportion to the torque deviation (Ttg−Tac). Clutch actuator control section 11e substitutes the torque deviation (Ttg−Tac) into this actuation amount relational expression in order to calculate the command actuation amount.

Storage unit 12 stores the actuation amount relational expressions. One expression (hereinafter referred to as engagement actuation amount relational expression, such as the relational expression shown in FIG. 6) is established to actuate clutch actuator 14 in the direction to engage clutch 40, if the torque deviation (Ttg−Tac) is positive. The other expression (hereinafter referred to as disengagement actuation amount relational expression) is established to actuate clutch actuator 14 in the opposite direction or the direction to disengage clutch 40. Clutch actuator control section 11e selects either the engagement or disengagement actuation amount relational expression, depending on a positive or negative value of the difference (hereinafter referred to as clutch rotational speed difference) in rotational speed between drive-side member 41 and driven-side member 42. Then, clutch actuator control section 11e substitutes the torque deviation (Ttg−Tac) into the selected actuation amount relational expression in order to calculate the command actuation amount. Specifically, if the clutch rotational speed difference is positive (the rotational speed of drive-side member 41 is higher than the rotational speed of driven-side member 42), clutch actuator control section 11e selects the engagement actuation amount relational expression. Meanwhile, if the clutch rotational speed difference is negative (the rotational speed of drive-side member 41 is lower than the rotational speed of driven-side member 42), clutch actuator control section 11e selects the disengagement actuation amount relational expression.

Figure 7:
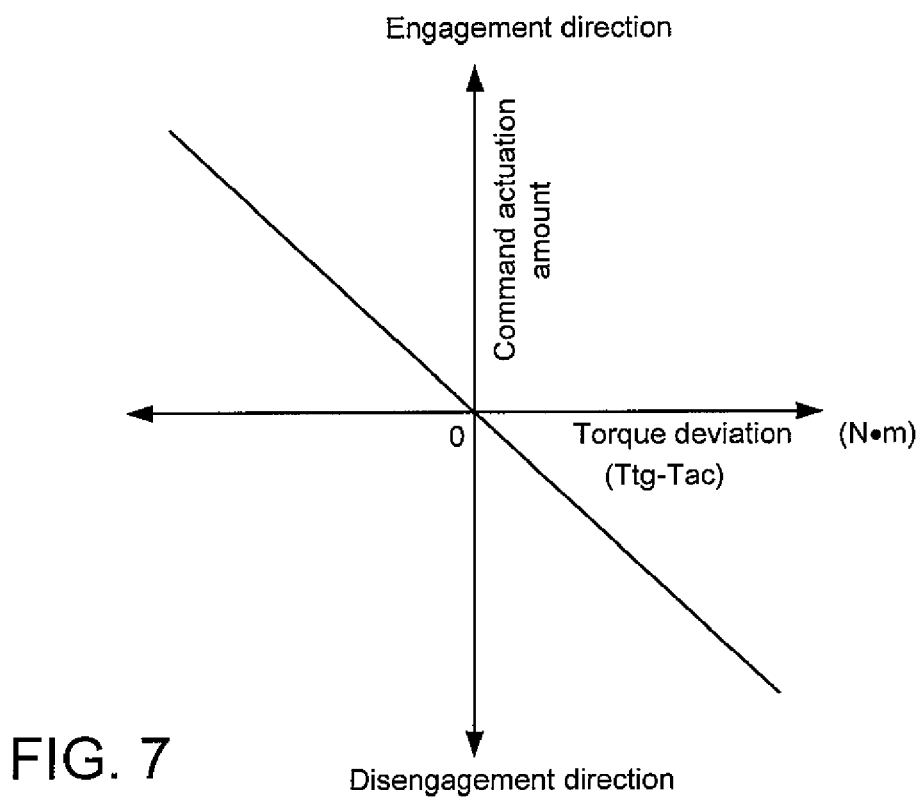
FIG. 7 is a graph illustrating the relationship between a difference between target transmission torque and actual transmission torque, and a command actuation amount obtained from a disengagement actuation amount relational expression.

FIG. 7 is a graph showing the relationship between the torque deviation (Ttg−Tac) and the command actuation amount obtained from the disengagement actuation amount relational expression. In the graph shown in FIG. 7, the actuation amount relational expression is established such that if the torque deviation (Ttg−Tac) is positive, clutch actuator 14 is actuated in the direction to disengage clutch 40, in contrast to the graph shown in FIG. 6.

In such a manner, clutch actuator control section 11e selects either the engagement or disengagement actuation amount relational expression, depending on a positive or negative value of the clutch rotational speed difference. This enables an engine brake to be applied when the vehicle starts on the downslope, for example. When the vehicle starts on the downslope, if accelerator displacement is set at zero, target transmission torque Ttg is a negative value in the target transmission torque table (see FIG. 5). At this moment, if clutch 40 is disengaged, actual transmission torque Tac is zero. Therefore, there is a negative difference between target transmission torque Ttg and actual transmission torque Tac (Ttg−Tac). In addition, because the vehicle starts on the downslope, if the rotational speed of drive-side member 41 is lower than the rotational speed of driven-side member 42, the disengagement actuation amount relational expression is selected. Consequently, a value of the command actuation amount that corresponds to the torque deviation (Ttg−Tac) is to actuate clutch 40 in the direction to engage clutch 40, so that the engine brake works.

The relationship between torque deviation and the command actuation amount is not limited to the relationship shown in FIG. 6 or 7. For example, the engagement and disengagement actuation amount relational expressions may be established such that the command actuation amount is proportional to the square of the torque deviation.

Storage unit 12 may store a table that establishes direct correspondence between the command actuation amount, and target transmission torque Ttg and actual transmission torque Tac, rather than the engagement actuation amount relational expression and the disengagement actuation amount relational expression that establish the correspondence between the torque deviation and the command actuation amount. In this case, clutch actuator control section 11e refers to the table to directly obtain the command actuation amount that corresponds to the calculated target transmission torque Ttg and actual transmission torque Tac.

Failure detecting section 11f is now described. Failure detecting section 11f implements processing for detecting a failure of clutch 40 (for example, a displacement of clutch position due to excessive wear-out of drive-side member 41 or driven-side member 42, or due to bubbles formed within hydraulic hose 20b). Failure detecting section 11f determines whether or not the vehicle operating conditions satisfy a predetermined condition (hereinafter referred to as failure detection implementation condition). If the failure detection implementation condition is satisfied, failure detecting section 11f implements processing for detecting a failure of clutch 40 based on actual transmission torque Tac and clutch position Pc detected by clutch position detector 22. As described above, failure detecting section 11f includes condition determining section 11g. Processing executed by condition determining section 11g is first described.

Condition determining section 11g determines whether or not vehicle operating conditions satisfy the failure detection implementation condition. The failure detection implementation condition determines whether or not vehicle operating conditions are appropriate to implementing processing for detecting a failure of clutch 40. For example, the failure detection implementation condition is defined to implement processing for detecting a failure of clutch 40 under the conditions that clutch 40 and clutch actuator 14 move moderately, and that there is generally a proportional relationship between clutch position Pc and actual transmission torque Tac. The failure detection implementation condition is more specifically described below.

For example, the failure detection implementation condition may relate to vehicle speed. Condition determining section 11g determines whether or not the vehicle speed detected by the vehicle speed signal is lower than a predetermined value (hereinafter referred to as vehicle speed condition value (several kilometers per hour)). If the vehicle speed is lower than the vehicle speed condition value, condition determining section 11g determines that the failure detection implementation condition is satisfied.

The failure detection implementation condition may include a condition related to the clutch rotational speed difference. In this case, for example, condition determining section 11g calculates the rotational speed of drive-side member 41 based on the signal from clutch rotational speed detector 23a, while calculating the rotational speed of driven-side member 42 based on the signal from clutch rotational speed detector 23b. Condition determining section 11g then determines whether or not the difference in rotational speed therebetween or the clutch rotational speed difference (hereinafter referred to as rotational speed difference condition value) is greater than a predetermined value. If the clutch rotational speed difference is greater than the rotational speed difference condition value, condition determining section 11g determines that the failure detection implementation condition is satisfied.

This allows processing for detecting a failure of clutch 40 to be implemented under the operating condition that there is a corresponding relationship between actual transmission torque Tac and clutch position Pc. More specifically, under the condition that the clutch rotational speed difference is greater than the rotational speed difference condition value (drive-side member 41 and driven-side member 42 slip each other, while both rotating), actual transmission torque Tac is dynamic friction force produced between drive-side member 41 and driven-side member 42. The dynamic friction force is proportional to pressing force produced therebetween, using a coefficient of dynamic friction between drive-side member 41 and driven-side member 42 as a proportionality constant. The pressing force is determined depending on clutch position Pc (displacement of clutch spring 44). Thus, under the condition that the clutch rotational speed difference is greater than the rotational speed difference condition value, actual transmission torque Tac corresponds to clutch position Pc. When a failure has occurred, such as excessive wear-out of drive-side member 41 or driven-side member 42 and bubbles formed in the oil within hydraulic hose 20a, actual transmission torque Tac and clutch position Pc deviate from the relationship between actual transmission torque Tac and clutch position Pc under no failure condition. Thus, under such operating condition that there is a corresponding relationship between actual transmission torque Tac and clutch position Pc, failure detecting section 11f determines if a failure has occurred to clutch 40 based on actual transmission torque Tac, which is actually detected during engaging operation of clutch 40, and based on the extent of deviation of the corresponding clutch position Pc. This processing executed by the failure detecting section 11f is discussed in detail later.

The failure detection implementation condition may include a condition related to the amount of actual transmission torque Tac. In this case, for example, condition determining section 11g determines whether or not actual transmission torque Tac, which is obtained from processing executed by actual torque obtaining section 11a, is higher than a predetermined value (hereinafter referred to as actual transmission torque condition value). If actual transmission torque Tac is higher than the actual transmission torque condition value, condition determining section 11g determines that the failure detection implementation condition is satisfied. Under the condition of extremely low actual transmission torque Tac, that is, a low degree of contact between drive-side member 41 and driven-side member 42, actual transmission torque Tac is affected by the inclination of a disk that forms drive-side member 41 or driven-side member 42, the amount of oil adhering to the disk, surface roughness of the disk and the like. The failure detection implementation condition includes the condition related to the amount of actual transmission torque Tac, which minimizes the impact of inclination of the disk and the like on detection of a failure of clutch 40.

Further, the failure detection implementation condition may include a condition related to the difference between actual transmission torque Tac and target transmission torque Ttg obtained by target torque obtaining section 11d or the torque deviation (Ttg−Tac). In this case, condition determining section 11g determines whether or not the torque deviation is smaller than a predetermined value (hereinafter referred to as torque deviation condition value). If the torque deviation (Ttg−Tac) is smaller than the torque deviation condition value, condition determining section 11g determines that the failure detection implementation condition is satisfied. This allows processing for detecting a failure of clutch 40 to be implemented when clutch 40 moves moderately.

Still further, the failure detection implementation condition may include a condition related to the time period required for engaging operation of clutch 40. For example, storage unit 12 stores in advance a table that establishes the correspondence between the time period estimated to be required for engaging operation of clutch 40, and the vehicle speed and target transmission torque Ttg. In this table, for example, the time period estimated to be required for engaging operation of clutch 40 is preset to be longer as vehicle speed becomes lower or target transmission torque Ttg becomes higher. In this case, condition determining section 11g refers to the table to obtain the estimated time period that corresponds to the vehicle speed, which is detected based on the vehicle speed signal from vehicle speed detector 19, and to target transmission torque Ttg, which is obtained by target torque obtaining section 11d. Condition determining section 11g then determines whether or not the obtained estimated time period is longer than a predetermined time period. If the estimated time period is longer than the predetermined time period, condition determining section 11g determines that the failure detection implementation condition is satisfied.

The processing executed by failure detecting section 11f in order to detect a failure of clutch 40 is now described. When a failure detection implementation condition is satisfied, failure detecting section 11f implements the processing for detecting a failure of clutch 40 based on actual transmission torque Tac and clutch position Pc. This processing is executed as follows, for example.

Storage unit 12 stores in advance a table or a relational expression that represents the relationship between actual transmission torque Tac and clutch position Pc. Failure detecting section 11f refers to the table or the relational expression stored in storage unit 12 to determine whether or not there is an appropriate relationship between actual transmission torque Tac, which is obtained by actual torque obtaining section 11a, and clutch position Pc, which is detected by clutch position detector 22. Based on the determination result, failure detecting section 11f detects if a failure has occurred to clutch 40.

Figure 8:
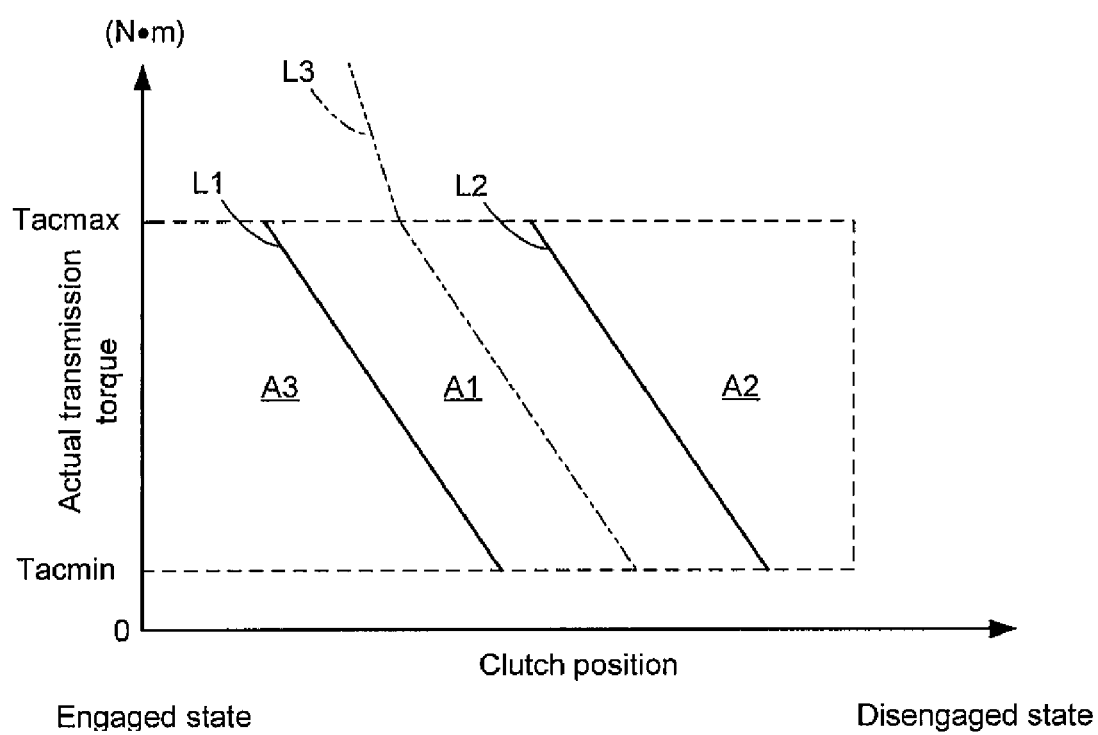
FIG. 8 illustrates an example of a failure determination table for determining the presence or absence of a failure.

FIG. 8 is a table (hereinafter referred to as failure determination table) illustrating an example of the relationship between actual transmission torque Tac and clutch position Pc. In FIG. 8, the horizontal axis represents clutch position Pc, and the vertical axis represents actual transmission torque Tac. In addition, the disengagement position along the horizontal axis represents the clutch position at the time when clutch 40 is completely disengaged, while the engagement position along the horizontal axis represents the clutch position at the time when clutch 40 is engaged. As shown in FIG. 8, in the failure determination table, for example, the range of clutch position Pc within which no failure is observed is sequentially preset corresponding to actual transmission torque Tac. Specifically, a minimum value (a value on line L1 in FIG. 8, hereinafter referred to as minimum allowable position) and a maximum value (a value on line L2 in FIG. 8, hereinafter referred to as maximum allowable position) of clutch position Pc at which no failure is observed are sequentially preset corresponding to actual transmission torque Tac. As shown by lines L1 and L2 in FIG. 8, the maximum and minimum allowable positions, which correspond to actual transmission torque Tac, are preset such that as actual transmission torque Tac increases, these allowable positions respectively come close to the engagement position. The maximum and minimum allowable positions also correspond to actual transmission torque Tac that is between the actual transmission torque condition value Tacmin and the upper limit value Tacmax of actual transmission torque Tac.

Phantom line L3 in FIG. 8 shows the relationship between actual transmission torque Tac and clutch position Pc when clutch 40 is in the best condition, such as when clutch 40 starts to be in service. The minimum allowable position is preset closer to the engagement position than clutch position Pc when clutch 40 is in the best condition. The maximum allowable position is preset closer to the disengagement position than clutch position Pc when clutch 40 is in the best condition.

If storage unit 12 stores the failure determination table as shown in FIG. 8, failure detecting section 11f determines whether or not clutch position Pc, which is detected, for example, based on the signal inputted from clutch position detector 22, falls within a range between the minimum and maximum allowable positions that correspond to actual transmission torque Tac obtained from the processing executed by actual torque obtaining section 11a (clutch position Pc is included in a region between line L1 and line L2, hereinafter referred to as allowable clutch region A1). If the detected clutch position Pc falls outside allowable clutch region A1, failure detecting section 11f determines that a failure has occurred to clutch 40, and informs the rider of the failure by, for example, lighting up the alarm light on indicator 6a (see FIG. 3).

Alternatively, failure detecting section 11f may determine whether or not the detected clutch position Pc is closer to the disengagement position than the maximum allowable position that corresponds to actual transmission torque Tac obtained from processing executed by actual torque obtaining section 11a (clutch position Pc is included in a region on the right side of line L2 in FIG. 8, hereinafter referred to as engagement degree exceeding region A2). In other words, failure detecting section 11f may determine whether or not a point (Pc, Tac), which corresponds to detected clutch position Pc and actual transmission torque Tac in the failure determination table, is included in engagement degree exceeding region A2. When point (Pc, Tac) is included in engagement degree exceeding region A2, the clutch position is closer to the disengagement position than in a normal state, while torque is transmitted via clutch 40 by an amount which is the same as in a normal state. Thus, the degree of engagement of clutch 40 is higher than when clutch 40 is a normal state, in terms of the same clutch position. Such excessive degree of engagement of clutch 40 is caused by, for example, bubbles formed within hydraulic hose 20a.

Alternatively, failure detecting section 11f may determine whether or not the detected clutch position Pc is closer to the engagement position than the minimum allowable position that corresponds to actual transmission torque Tac obtained from processing executed by actual torque obtaining section 11a (clutch position Pc is included in a region on the left side of line L1 in FIG. 8, hereinafter referred to as engagement degree lacking region A3). In other words, failure detecting section 11f may determine whether or not a point (Pc, Tac), which corresponds to the detected clutch position Pc and actual transmission torque Tac in the failure determination table, is included in engagement degree lacking region A3. When point (Pc, Tac) is included in engagement degree lacking region A3, the clutch position is closer to the engagement position than in a normal state, while torque is transmitted via clutch 40 by an amount which is the same as in a normal state. Thus, the degree of engagement of clutch 40 is lower than when clutch 40 is a normal state, in terms of the same clutch position. Such lowered degree of engagement of clutch 40 is caused by, for example, excessive wear-out of drive-side member 41 or driven-side member 42.

If the result of such determination shows that point (Pc, Tac), which corresponds to actual transmission torque Tac and clutch position Pc in the failure determination table, is included in engagement degree exceeding region A2 or in engagement degree lacking region A3, failure detecting section 11f determines that a failure has occurred to clutch 40, and informs the rider of the failure by, for example, lighting up the alarm light on indicator 6a (see FIG. 3). Alternatively, failure detecting section 11f may light up indicator 6a in different modes depending on whether point (Pc, Tac), which corresponds to actual transmission torque Tac and clutch position Pc, is included in engagement degree exceeding region A2 or in engagement degree lacking region A3. This allows the rider to estimate the type of failure occurring to clutch 40, for example, whether or not drive-side member 41 or driven-side member 42 wear-out excessively or bubbles are formed within hydraulic hose 20a.

Further alternatively, while the failure detection implementation condition is satisfied, failure detecting section 11f may determine several times whether or not point (Pc, Tac), which corresponds to actual transmission torque Tac and clutch position Pc in the failure determination table, is included in allowable clutch region A1 or the like in a predetermined cycle. Failure detecting section 11f may determine the presence or absence of a failure of clutch 40 based on the frequency with which point (Pc, Tac) is determined not to be included in allowable clutch region A1 or based on the frequency with which point (Pc, Tac) is determined to be included in engagement degree exceeding region A2 or lacking region A3.

For example, while the failure detection implementation condition is satisfied, failure detecting section 1 if obtains clutch position Pc and actual transmission torque Tac a predetermined number of times, and determines whether or not each clutch position Pc falls within a range between the minimum and maximum allowable positions that correspond to actual transmission torque Tac. Failure detecting section 11f then counts the number of times (hereinafter referred to as number of times of failure) that the detected clutch position Pc is determined not to fall within the range between the minimum and maximum allowable positions that correspond to actual transmission torque Tac. If the ratio of the number of times of failure to the total number of times of determination exceeds a predetermined value, failure detecting section 11f may determine that a failure has occurred to clutch 40.

In implementing such processing, failure detecting section 11f may inform the rider of the severity of the failure occurring to clutch 40 based on the ratio of the number of times of failure to the total number of times of determination. For example, failure detecting section 11f may gradually change the display mode of indicator 6a, such as the size or brightness of the lighting area thereon, depending on the ratio of the number of times of failure to the total number of times of determination.

In addition, information on the relationship between actual transmission torque Tac and the clutch position, which is provided for the processing to detect a failure of clutch 40, is not limited to the failure determination table shown in FIG. 8. For example, storage unit 12 may store a relational expression that represents the relationship between actual transmission torque Tac and the minimum allowable position or a relational expression that represents the relationship between actual transmission torque Tac and the maximum allowable position. Thus, failure detecting section 11f may substitute actual transmission torque Tac obtained from processing executed by actual torque obtaining section 11a into the relational expression as such, and determine whether or not the detected clutch position Pc is closer to the disengagement position than the maximum allowable position corresponding to the obtained actual transmission torque Tac or whether or not the detected clutch position Pc is closer to the engagement position than the minimum allowable position corresponding to the obtained actual transmission torque Tac.

Shift actuator control section 11h is now described. When the rider operates shift-up switch 9a or shift-down switch 9b to provide gear shifting instructions, shift actuator control section 11h changes shift gears 53a, 53b, 54a, 54b to transmit torque. Specifically, shift actuator control section 11h outputs a control signal to shift actuator drive circuit 15 according to the gear shifting instructions. Shift actuator drive circuit 15 outputs electric power to drive shift actuator 16 according to the control signal.

When the rider provides start-up or gear shifting instructions, clutch actuator control section 11e actuates clutch actuator 14 to temporarily disengage clutch 40 in order to interrupt torque transmission from drive-side member 41 to driven-side member 42. Shift actuator control section 11h moves shift gears 53a, 53b, 54a or 54b in order to set the gear shift in a position designated by the rider's operation of shift-up button 9a or shift-down button 9b. After detecting that shift gears 53a, 53b, 54a or 54b have already been moved based on the signal inputted from gear position detector 21, clutch actuator control section 11e starts engaging operation of clutch 40.

Figure 9:
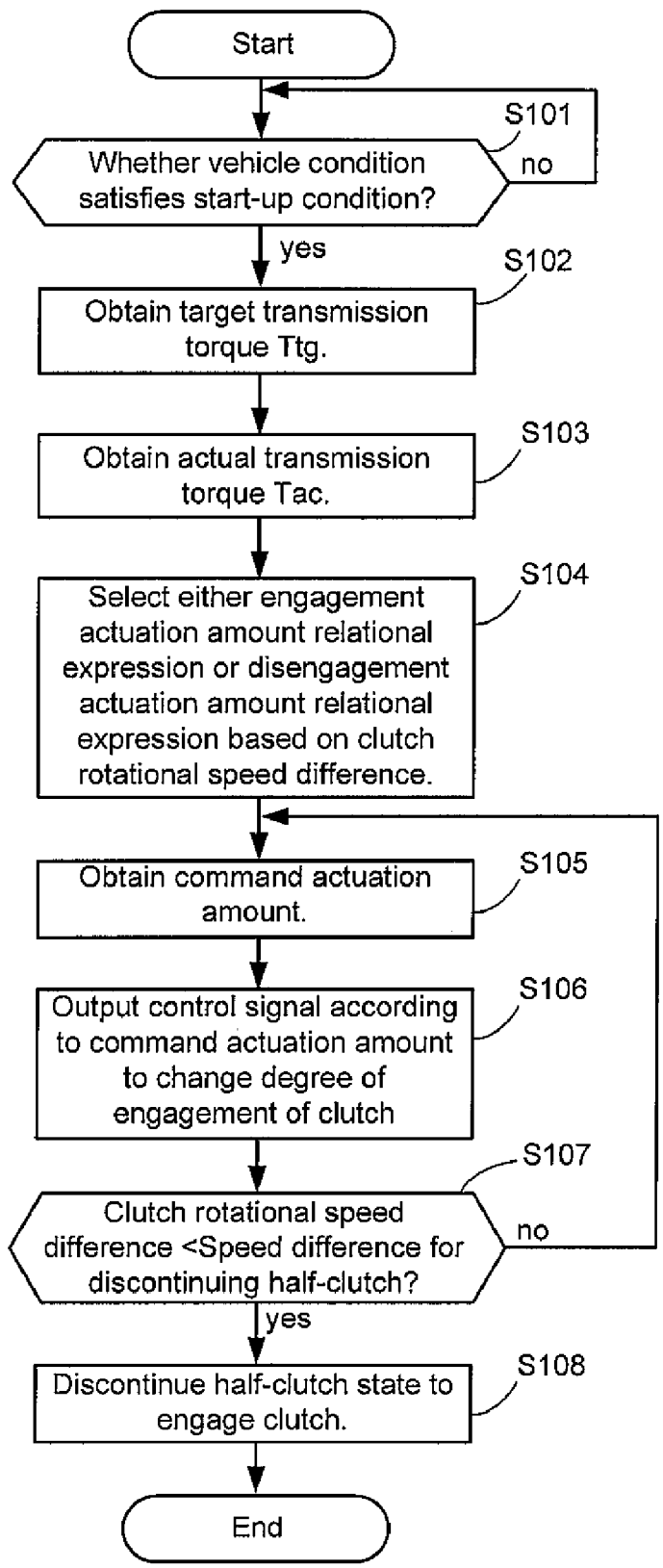
FIG. 9 is a flowchart illustrating an example of processing steps executed by the control unit to control the degree of engagement of the clutch.

A flow of processing executed by control unit 11 is described with reference to FIGS. 9 and 10. FIG. 9 is a flowchart showing an example of processing steps executed by control unit 11 in order to control the degree of engagement of clutch 40. FIG. 10 is a flowchart showing an example of processing steps executed by control unit 11 in order to detect a failure of clutch 40.

First, with reference to FIG. 9, processing steps executed in order to control the degree of engagement of clutch 40 are described. Control unit 11 first determines whether or not the vehicle operating conditions satisfy predetermined start-up conditions (step S101). The start-up conditions are that for example, clutch 40 is disengaged, with gearbox 51 set in a position other than neutral position; engine speed and accelerator displacement are equal to or greater than their respective predetermined values; and vehicle speed is below the vehicle speed condition value. Alternatively, continuation of these conditions for a given time period or longer may also be a predetermined start-up condition.

In step S101, if the vehicle operating conditions are determined to satisfy the start-up conditions, target torque obtaining section 11d detects accelerator displacement, and refers to the aforementioned target transmission torque table (see FIG. 5) to obtain the target transmission torque Ttg that corresponds to accelerator displacement (step S102).

In turn, actual torque obtaining section 11a obtains actual transmission torque Tac transmitted from drive-side member 41 to driven-side member 42 (step S103). Further, clutch actuator control section 11e calculates the clutch rotational speed difference based on the signals inputted from clutch rotational speed detectors 23a, 23b. Depending on a positive or negative value of the calculated clutch rotational speed difference, clutch actuator control section 11e selects either the engagement or disengagement actuation amount relational expression (step S104). Specifically, if the clutch rotational speed difference is positive (the rotational speed of drive-side member 41 is higher than the rotational speed of driven-side member 42), clutch actuator control section 11e selects the engagement actuation amount relational expression. Meanwhile, if the clutch rotational speed difference is negative, clutch actuator control section 11e selects the disengagement actuation amount relational expression.

Clutch actuator control section 11e then substitutes the difference between target transmission torque Ttg and actual transmission torque Tac or the torque deviation (Ttg−Tac) into the selected engagement or disengagement actuation amount relational expression in order to obtain the command actuation amount (step S105). Clutch actuator control section 11e then outputs a control signal to clutch actuator drive circuit 15 according to the command actuation amount in order to change the degree of engagement of clutch 40 (step S106).

Next, clutch actuator control section 11e recalculates the clutch rotational speed difference, and determines whether or not the recalculated clutch rotational speed difference (hereinafter referred to as speed difference for discontinuing half-clutch) is smaller than a predetermined value (step S107). If the clutch rotational speed difference is equal to or greater than the speed difference for discontinuing half-clutch, control unit 11 returns to step S105 to execute the subsequent processing steps again. In contrast, if the clutch rotational speed difference is smaller than the speed difference for discontinuing half-clutch, control unit 11 discontinues the half-clutch state of clutch 40 to completely engage drive-side member 41 with driven-side member 42 (step S108). The aforementioned processing is an example of processing executed by control unit 11 at vehicle start-up.

Figure 11A:
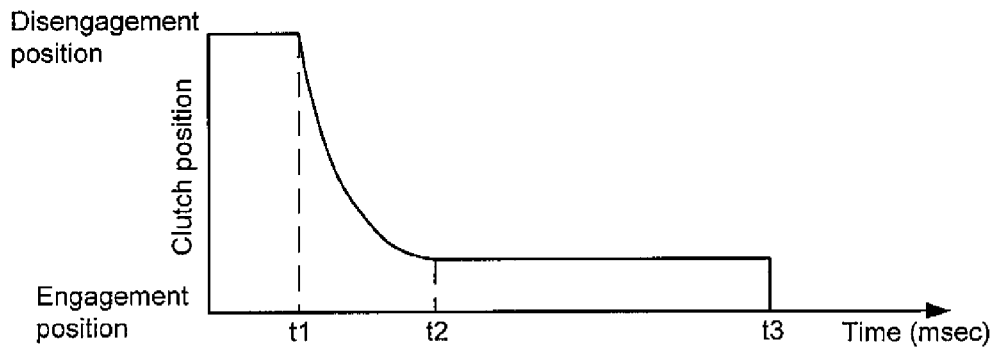
FIGS. 11(a)-11(c) are time charts respectively showing changes in target transmission torque, actual transmission torque and degree of engagement of the clutch with respect to time when the vehicle starts up.
Figure 11B:
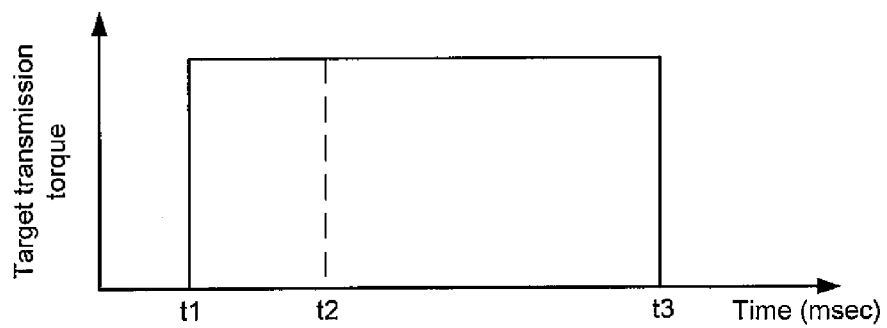
Figure 11C:
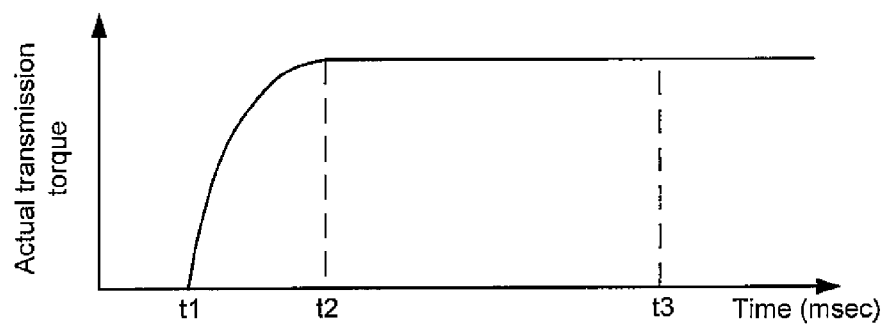

FIGS. 11(a)-11(c) are time charts respectively showing examples of changes in clutch position Pc, actual transmission torque Tac and target transmission torque Ttg with respect to time, due to processing executed by control unit 11 when the vehicle starts up. FIG. 11(a) shows clutch position Pc. FIG. 11(b) shows target transmission torque Ttg. FIG. 11(c) shows actual transmission torque Tac. In FIGS. 11(a)-11(c), the horizontal axis represents time. As shown in FIGS. 11(a) and 11(c), at the stage prior to vehicle start-up, clutch position Pc is set at a position at which clutch 40 is disengaged (the disengagement position in FIG. 11(a)), and actual transmission torque Tac is zero. After that, when the start-up conditions are satisfied and the rider operates the throttle, target transmission torque Ttg is set according to the rider's throttle operation, as shown in FIG. 11(b) (at time t1). This creates the difference between target transmission torque Ttg and actual transmission torque Tac, or the torque deviation (Ttg−Tac). Under control by clutch actuator control section 11e, engaging operation of clutch 40 starts. Clutch actuator 14 is then actuated by an actuation amount according to the torque deviation (Ttg−Tac). As shown in FIG. 11(a), clutch position Pc gradually approaches the position at which clutch 40 is engaged (the engagement position in FIG. 11(a)). Consequently, actual transmission torque Tac corresponds with target transmission torque Ttg at time t2. Then, at time (t3) when the clutch rotational speed difference is below the speed difference for discontinuing half-clutch, clutch 40 is completely engaged. Because actual transmission torque Tac corresponds with target transmission torque Ttg from time t2 to time t3, clutch position Pc is generally maintained.

Now, with reference to FIGS. 11(a)-11(c), the processing executed by control unit 11 to detect a failure of clutch 40 is described. An example is described where processing for detecting a failure of clutch 40 is implemented during engaging operation of clutch 40 for vehicle start-up. In addition, while the failure detection implementation condition is satisfied, control unit 11 detects actual transmission torque Tac and clutch position Pc several times, counts the number of times that point (Pc, Tac), which corresponds to the detected actual transmission torque Tac and clutch position Pc in the failure determination table, falls within allowable clutch region A1 (hereinafter referred to as number of times of propriety i1), the number of times that point (Pc, Tac) falls within engagement degree exceeding region A2 (hereinafter referred to as number of times of excess i2), and the number of times that point (Pc, Tac) falls within engagement degree lacking region A3 (hereinafter referred to as number of times of lack i3), and determines the presence or absence of a failure of clutch 40 based on these numbers of times.

Failure detecting section 11f first sets to zero each of the initial values of the number of times of propriety i1, the number of times of excess i2, and the number of times of lack is (step S201). Actual torque obtaining section 11a then obtains actual transmission torque Tac (step S202), and target torque obtaining section 11d obtains target transmission torque Ttg (step S203). Next, condition determining section 11g determines whether or not the vehicle operating conditions satisfy the failure detection implementation condition (step S204). Specifically, condition determining section 11g determines whether or not the vehicle operating conditions satisfy the aforementioned start-up conditions, whether or not actual transmission torque Tac is higher than the actual transmission torque condition value, whether or not the difference between target transmission torque Ttg and actual transmission torque Tac is smaller than the torque deviation condition value, and whether or not the clutch rotational speed difference is greater than the rotational speed difference condition value. As described above, the start-up conditions include that the vehicle speed is below the vehicle speed condition value. In this step, if the failure detection implementation condition is not yet satisfied, control unit 11 returns to step S202 to execute the subsequent processing steps again.

In contrast, if the failure detection implementation condition is satisfied, failure detecting section 11f starts processing for determining the presence or absence of a failure of clutch 40. Specifically, failure detecting section 11f detects clutch position Pc (step S205), and determines whether or not point (Pc, Tac), which corresponds to the detected clutch position Pc and the actual transmission torque Tac obtained in step S202, is included in engagement degree exceeding region A2 (step S206). If point (Pc, Tac) is included in engagement degree exceeding region A2, failure detecting section 11f increments the number of times of excess i2 (step S207). If point (Pc, Tac) is not included in engagement degree exceeding region A2, failure detecting section 11f determines whether or not point (Pc, Tac) is included in engagement degree lacking region A3 (step S208). If point (Pc, Tac) is included in engagement degree lacking region A3, failure detecting section 11f increments the number of times of lack i3 (step S209). If point (Pc, Tac) is not included in engagement degree lacking region A3, failure detecting section 11f increments the number of times of propriety i1 (step S210).

The failure detecting section 11f determines whether or not the number of times of determination, in the steps S206 and S208, whether or not the point (Pc, Tac), which corresponds to the clutch position Pc and the actual transmission torque Tac, is included in the engagement degree exceeding region A2 or in the engagement degree lacking region A3 (i.e. the number of times of propriety i1+the number of times of excess i2+the number of times of lack i3) is equal to or greater than a predetermined number of times (step S211). In this step, if the number of times of the determination does not reach the predetermined number of times, the control unit 11 returns to the step S202 to execute the subsequent processing steps again.

In contrast, if the number of times of the determination in steps S206 and S208 is equal to or greater than the predetermined number of times, failure detecting section 11f determines whether or not the counted number of times of excess i2 exceeds the number of times of propriety i1 (step S212). If the number of times of excess i2 exceeds the number of times of propriety i1, a failure has occurred to clutch 40. That is, the clutch position is greater (closer to the disengagement position) than in a normal state, and torque is transmitted to driven-side member 42 by an amount that is the same as in a normal state (for example, bubbles are formed within hydraulic hose 20a). Thus, failure detecting section 11f lights up indicator 6a in order to inform the rider of the failure (step S213). If the number of times of excess i2 does not exceed the number of times of propriety i1, failure detecting section 11f determines whether or not the number of times of lack i3 exceeds the number of times of propriety i1 (step S214). If the number of times of lack i3 exceeds the number of times of propriety i1, a failure has occurred to clutch 40. That is, the clutch position is smaller (closer to the engagement position) than in a normal state, and torque is transmitted to driven-side member 42 by an amount which is the same as in a normal state (for example, wear-out of drive-side member 41 or driven-side member 42). In this case, failure detecting section 11f lights up indicator 6a in order to inform the rider of the failure (step S215). Failure detecting section 11f may light up indicator 6a in different modes in step S213 and step S215.

If the determination result from step S214 shows that the number of times of lack i3 does not exceed the number of times of propriety i1, failure detecting section 11f determines that no failure occurs to clutch 40, and ends the processing.

In the example of processing shown in FIG. 10, whether or not point (Pc, Tac), which corresponds to actual transmission torque Tac and clutch position Pc in the failure determination table, is included in engagement degree exceeding region A2 or in engagement degree lacking region A3 is determined while the failure detection implementation condition is satisfied. This determination is made between time t2 and time t3 in the time charts shown in FIGS. 11(a)-11(c), in the case where the rotational speed difference condition value is preset equal to the aforementioned speed difference for discontinuing half-clutch, and the torque deviation condition value is preset at or close to zero as the failure detection implementation condition. The presence or absence of a failure is thus determined under the operating condition that clutch position Pc changes insignificantly.

Failure detection system 10 detects a failure of clutch 40 based on actual transmission torque Tac and clutch position Pc. This enables accurate detection of a failure of clutch 40. Clutch failure detection is achieved, for example, independent of the gradient of the slope.

In failure detection system 10, actual torque obtaining section 11a calculates actual transmission torque Tac based on EG torque TEac outputted from engine 30 and based on EG-side inertia torque TIac produced on the mechanism upstream of drive-side member 41 in the torque transmission path. The actual transmission torque is thus obtained by simple processing without using any specific sensor or the like for directly detecting torque.

In addition, in failure detection system 10, failure detecting section 11f determines whether or not the vehicle operating conditions satisfy the predetermined failure detection implementation condition, and based on the determination result, implements processing for detecting a failure of clutch 40. This allows processing for detecting a failure of clutch 40 to be implemented in a situation where accurate detection of the failure is practicable.

The failure detection implementation condition includes the condition related to vehicle speed (hereinbefore referred to as vehicle speed condition value). This allows processing for detecting a failure of clutch 40 to be implemented when the half-clutch state is continued relatively longer, such as when the vehicle starts up or is running at low speeds, and therefore enhances the accuracy of failure detection.

The failure detection implementation condition also includes the condition related to the difference (hereinbefore referred to as rotational speed difference condition value) in rotational speed between drive-side member 41 and driven-side member 42 of clutch 40. Thereby, under the operating condition that there is a corresponding relationship between actual transmission torque Tac and clutch position Pc, failure detecting section 11f determines the presence or absence of a failure of clutch 40 based on whether or not the relationship between actual transmission torque Tac and clutch position Pc, which are actually detected during engaging operation of clutch 40, is appropriate.

The failure detection implementation condition further includes the condition related to the amount of actual transmission torque Tac (hereinbefore referred to as actual transmission torque condition value). As described above, under the condition of low actual transmission torque Tac, that is, a low degree of contact between drive-side member 41 and driven-side member 42, actual transmission torque Tac is significantly affected by inclination of a disk that forms drive-side member 41 or driven-side member 42, the amount of oil adhering to the disk, surface roughness of the disk, and the like. Thus, including the condition related to the amount of actual transmission torque Tac into the failure detection implementation condition allows processing for detecting a failure of clutch 40 to be implemented under the operating condition that the impact of inclination of the disk and the like on actual transmission torque Tac is insignificant. This therefore enhances the accuracy of the failure detection.

Control unit 11 actuates clutch actuation mechanism 20 according to the difference between actual transmission torque Tac and target transmission torque Ttg that is supposed to be transmitted from drive-side member 41 to driven-side member 42, in order to control the relative positions of drive-side member 41 and driven-side member 42. The failure detection implementation condition includes the condition related to the difference (hereinbefore referred to as torque deviation condition value) between target transmission torque Ttg and actual transmission torque Tac. This allows processing for detecting a failure of clutch 40 to be implemented when the difference between actual transmission torque Tac and target transmission torque Ttg is small and when clutch position Pc changes moderately, and therefore enhances the accuracy of failure detection.

Storage unit 12 holds information on the relationship between actual transmission torque Tac and clutch position Pc (hereinbefore referred to as a failure determination table). Thus, based on actual transmission torque Tac obtained by actual torque obtaining section 11a, and based on clutch position Pc obtained by clutch position detector 22, failure detecting section 11f refers to information stored in storage unit 12 to detect a failure of clutch 40. This allows the presence of absence of a failure of clutch 40 to be determined based on the discrepancy between the pre-estimated appropriate relationship between actual transmission torque Tac and clutch position Pc, and the relationship between the actually-detected actual transmission torque Tac and clutch position Pc.

In addition, failure detecting section 11f obtains clutch position Pc and actual transmission torque Tac several times in the process that clutch 40 is switched from the disengaged state to the engaged state. Based on the several data of clutch position Pc and actual transmission torque Tac, failure detecting section 11f detects a failure of clutch 40. Accuracy of failure detection is thereby enhanced.

The present invention is not limited to the specifically-described embodiment of failure detection system 10 and can have various alternatives. The failure determination table is described as a two-dimensional table that allows the range of clutch positions Pc within which no failure is observed to sequentially correspond to actual transmission torque Tac. However, the failure determination table is not limited to this and, for example, may allow the range of clutch positions Pc within which no failure is observed to correspond to one value of actual transmission torque Tac or several values of actual transmission torque Tac preset in a discrete manner. If such a failure determination table is established, failure detecting section 11f detects clutch position Pc when actual transmission torque Tac transmitted from drive-side member 41 to driven-side member 42 during engaging operation of clutch 40 reaches actual transmission torque Tac preset in the failure determination table. Then, failure detecting section 11f determines whether or not the detected clutch position Pc falls within the preset range of clutch positions in the failure determination table.

In the above description, when the vehicle starts up or is running at low speeds, processing for detecting a failure of clutch 40 is implemented. However, failure detecting section 11f may obtain actual transmission torque Tac during engaging operation of clutch 40 for gear shifting, and based on the obtained actual transmission torque Tac and clutch position Pc, determine the presence or absence of a failure of clutch 40. In this case, failure detecting section 11f may implement processing for detecting a failure of clutch 40 at the time of the shift-down operation that requires a relatively longer time period for the engaging operation of clutch 40 than at the time of the shift-up operation.

Motorcycle 1 is provided with engine 30 as a driving source. Alternatively, the driving source may be an electric motor or a hybrid engine combining an electric motor and an engine.

In addition, in the above description, failure detection system 10 and clutch 40 are described as applying to motorcycle 1. However, the failure detection system 10 may apply to other vehicles such as four-wheeled automobiles.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A clutch failure detection system comprising:
    a clutch actuation mechanism for changing relative positions of a drive-side member and a driven-side member of a clutch;
    a position detector for detecting a position of the clutch actuation mechanism as a clutch position;
    a torque obtaining section for obtaining torque transmitted from the drive-side member to a downstream mechanism in a torque transmission path as transmission torque, the downstream mechanism including the driven-side member; and
    a failure detecting section for detecting a failure of the clutch based on the transmission torque and the clutch position, wherein the failure detecting section obtains the clutch position and the transmission torque at a plurality of times in a process that the clutch is switched from a disengaged state to an engaged state and classifies a plurality of data, that are each based upon the obtained clutch position and the transmission torque at one of the plurality of times, into one of a plurality of regions including a first region and a second region, when a predetermined number of data are classified into the plurality of regions the failure detecting section
    detects the failure of the clutch when a first number of the plurality of data that are classified into the first region exceeds a second number of the plurality of data that are classified into the second region, and
    detects there is no failure of the clutch when the first number does not exceed the second number.

2. The clutch failure detection system according to claim 1, wherein the failure detecting section determines whether or not a vehicle operating condition satisfies a predetermined condition, and based on a determination result, implements processing for detecting the failure of the clutch.

3. The clutch failure detection system according to claim 2, wherein the predetermined condition relates to a vehicle speed.

4. The clutch failure detection system according to claim 2, wherein the predetermined condition relates to a difference in rotational speed between the drive-side member and the driven-side member of the clutch.

5. The clutch failure detection system according to claim 2, wherein the predetermined condition relates to an amount of the transmission torque.

6. The clutch failure detection system according to claim 2, further comprising:
    a control unit for actuating the clutch actuation mechanism according to a difference between the transmission torque and target torque that is supposed to be transmitted from the drive-side member to the downstream mechanism in order to control the relative positions, wherein the predetermined condition relates to a difference between the target torque and the transmission torque.

7. The clutch failure detection system according to claim 1, further wherein the plurality of regions includes a third region, and the failure detecting section detects that the failure of the clutch exists if a third number of the plurality of data that are classified into the third region exceeds the second number.

8. The clutch failure detection system according to claim 7, wherein the first number, the second number and the third number are each stored in a separate counter, and if no failure of the clutch is detected, all of said counters are reset to zero and the failure detecting section obtains clutch position and transmission torque at a plurality of times in another process that the clutch is switched from a disengaged state to an engaged state to detect the failure of the clutch.

9. The clutch failure detection system according to claim 7, further including an indicator that is activated when failure of the clutch is detected, the indicator being in a first display mode if the third number is greater than the second number and a second display mode if the first number is greater than the second number.

10. The clutch failure detection system according to claim 7, wherein the first region is an engagement degree exceeding region, the second region is an allowable clutch region and the third region is an engagement degree lacking region.

11. The clutch failure detection system according to claim 1, further including an indicator that is activated when the failure of the clutch is detected, when the indicator is activated a display mode of the indicator is determined based upon a ratio of the first number to the predetermined number.

12. The clutch failure detection system according to claim 1, wherein the torque obtaining section calculates the transmission torque based on torque outputted from a driving source and inertia torque produced in a mechanism upstream of the drive-side member in the torque transmission path.

13. The clutch failure detection system according to claim 1, further comprising:
    a storage unit for storing in advance information on a relationship between the transmission torque and the clutch position, wherein the failure detecting section refers to information stored in the storage unit based on the transmission torque that is obtained by the torque obtaining section, and the clutch position that is obtained by the position detector, to detect the failure of the clutch.

14. A straddle-type vehicle comprising the clutch failure detection system according to claim 1.

15. A method for detecting a clutch failure comprising the steps of:
    (i). detecting a position of a clutch actuation mechanism for changing relative positions of a drive-side member and a driven-side member of a clutch as a clutch position;
    (ii). obtaining torque transmitted from the drive-side member to a downstream mechanism in a torque transmission path as transmission torque, the downstream mechanism including the driven-side member;

(iii). classifying a plurality of data, that are each based upon the detected clutch position and the obtained transmission torque at one of a plurality of times that the clutch is switched from a disengaged state to an engaged state, into one of a plurality of regions including a first region and a second region; and (iv). determining whether a failure of the clutch exists when a predetermined number of data are classified into the plurality of regions, the failure of the clutch being determined to exist if a first number of the plurality of data that are classified into the first region exceeds a second number of the plurality of data that are classified into the second region, and failure of the clutch is determined to not exist if the first number does not exceed the second number.

16. The method for detecting a clutch failure according to claim 15, further wherein plurality of regions includes a third region and the step of determining whether a failure of the clutch exists includes determining that the failure of the clutch exists if a third number of the plurality of data that are classified into the third region exceeds the second number.

17. The method for detecting a clutch failure according to claim 16, wherein the first number, the second number and the third number are each stored in a separate counter, and the method further includes:

if no failure of the clutch is determined, resetting all of said counters to zero; and repeating each of steps (i)-(iv).

18. The method for detecting a clutch failure according to claim 16, wherein the first region is an engagement degree exceeding region, the second region is an allowable clutch region and the third region is an engagement degree lacking region.

19. The method for detecting a clutch failure according to claim 16, wherein the failure of the clutch is determined to exist and the method further comprises activating an indicator, the indicator being in a first display mode if the third number is greater than the second number and a second display mode if the first number is greater than the second number.

20. The method for detecting a clutch failure according to claim 15, wherein the failure of the clutch is determined to exist, and the method further comprises:

calculating a ratio of the first number to the predetermined number; and changing a display mode of an indicator depending on the calculated ratio.

* * * * *